(12) United States Patent
Imatoh

(10) Patent No.: US 11,151,059 B2
(45) Date of Patent: Oct. 19, 2021

(54) SEMICONDUCTOR DEVICE, PERIPHERAL DEVICE CONTROL SYSTEM, AND PERIPHERAL DEVICE CONTROL METHOD

(71) Applicant: LAPIS Semiconductor Co., Ltd., Yokohama (JP)

(72) Inventor: Yuki Imatoh, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 0 days.

(21) Appl. No.: 16/730,523

(22) Filed: Dec. 30, 2019

(65) Prior Publication Data
US 2020/0242053 A1 Jul. 30, 2020

(30) Foreign Application Priority Data
Jan. 30, 2019 (JP) .............................. JP2019-014475

(51) Int. Cl.
*G06F 13/10* (2006.01)
*G06F 9/30* (2018.01)

(52) U.S. Cl.
CPC ........ *G06F 13/102* (2013.01); *G06F 9/30098* (2013.01)

(58) Field of Classification Search
CPC .... G06F 13/102; G06F 9/30098; G06F 11/10; G06F 11/1004
See application file for complete search history.

(56) References Cited

U.S. PATENT DOCUMENTS

| | | | | |
|---|---|---|---|---|
| 6,052,522 A | * | 4/2000 | Mattela ..................... | G06F 5/01 703/13 |
| 2009/0323547 A1 | * | 12/2009 | Caesar, Jr. ............. | H04L 47/245 370/252 |
| 2015/0301933 A1 | * | 10/2015 | Tuers ................... | G06F 11/1048 714/773 |
| 2016/0117217 A1 | * | 4/2016 | Anand ................ | G06F 11/1004 714/57 |
| 2016/0266836 A1 | * | 9/2016 | Tran ..................... | G06F 11/1004 |
| 2017/0060673 A1 | * | 3/2017 | Bowman ............. | G06F 11/1056 |
| 2018/0121282 A1 | * | 5/2018 | Barrilado Gonzalez ..................... G06F 11/10 |

FOREIGN PATENT DOCUMENTS

JP 2018-128771 A 8/2018

* cited by examiner

*Primary Examiner* — Tim T Vo
*Assistant Examiner* — Phong H Dang
(74) *Attorney, Agent, or Firm* — Rabin & Berdo, P.C.

(57) ABSTRACT

A semiconductor device of a peripheral device control system includes one or more management blocks that are provided in association with a device to be controlled. The management blocks each include a plurality of registers that store information pertaining to each operation of the device to be controlled, and a first generation unit that performs a predetermined aggregation process on values of the plurality of registers included in the management block to generate an aggregation value that is a value formed by aggregating the values of the plurality of registers.

10 Claims, 6 Drawing Sheets

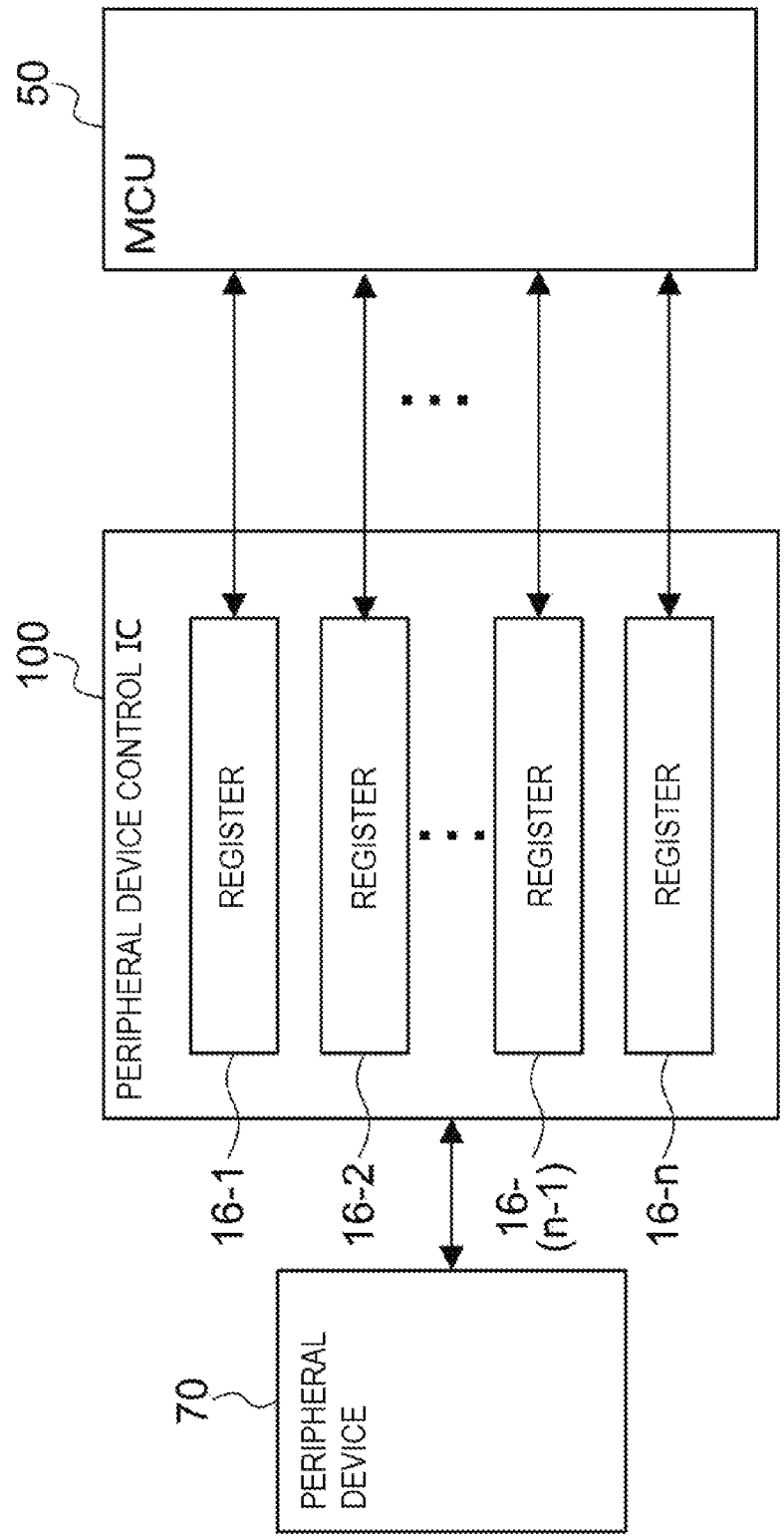

SEMICONDUCTOR DEVICE, PERIPHERAL DEVICE CONTROL SYSTEM, AND PERIPHERAL DEVICE CONTROL METHOD

TECHNICAL FIELD

The present invention relates to a semiconductor device, a peripheral device control system, and a peripheral device control method, and in particular, to a semiconductor device, a peripheral device control system, and a peripheral device control method that can handle increased throughput resulting from refreshing of a control register of a peripheral device.

BACKGROUND ART

Currently, there has been an increase in devices equipped with an MCU (microcontroller unit). Amid this trend, there has also been a concurrent increase in LSIs (large-scale integrated circuits, hereinafter, "peripheral device control ICs") that control external devices that receive control instructions from an MCU such as sensors, display controllers, and image correction chips (hereinafter, "peripheral devices"), and MCUs, peripheral device control ICs, and peripheral devices constitute an integrated system. In such a system, the MCU alone controls the peripheral devices through the peripheral device control IC.

The issue here is the settings for the peripheral devices. In general, settings of the peripheral devices are stored in a register in the peripheral device control IC corresponding to each peripheral device. There are cases in which malfunctions resulting from noise or the like cause the register to be rewritten, and thus, the register is typically refreshed periodically, with all registers being overwritten to keep the settings of the peripheral devices updated. "Refreshing" typically refers to a function in which the MCU or the like that controls and manages the peripheral devices such as sensors periodically confirms the set registers and overwrites the registers when controlling the peripheral device control IC corresponding to the peripheral device.

Japanese Patent Application Laid-Open Publication No. 2018-128771 discloses an electronic control device including: a microcomputer that performs processing in order to control the driving of a load on the basis of data stored in a non-volatile memory according to an event that occurs in relation to the refreshing, and stores, in a data register, control data that is the processing results; and a driving IC that drives the load on the basis of the control data, the driving IC including a communication unit that performs communication with the microcomputer, a control register in which writing of control data is performed by the microcomputer through the communication unit, and a refresh timer that generates at a constant frequency a trigger signal for refreshing the data stored in the control register, an interrupt signal being outputted to the microcomputer if the trigger signal is generated, and the microcomputer performing refreshing by performing processing again for control data to be refreshed upon receipt of the interrupt signal and overwriting the control register of the driving IC with the control data that is the processing results.

However, the peripheral devices, and in particular, the display controller, the image correction chip, and the like have had an increased number of functions in recent years, and as a result, there has been an increase in settings thereof. As a result, the burden of software on the MCU resulting from an increase in the number of accesses resulting from the refresh processing has also increased, and there is frequent writing to and reading from registers. Thus, there is an increased probability of damage to the registers. Additionally, there is the problem that the longer the time required for refreshing is, the longer the time is until the damaged register is repaired. In other words, as a result of an increase in the number of peripheral devices and an increased number of functions in the peripheral devices, the amount of time required for refreshing also increases, and refresh processing requires a large amount of software capacity, which has a significant effect on other software processing. Therefore, a decrease in software processing for refresh processing in controlling multiple peripheral devices, and a decrease in access time are desired.

Japanese Patent Application Laid-Open Publication No. 2018-128771 also states the problem of high processing load on the microcomputer resulting from refreshing, but seeks to solve the problem through interrupt processing, and does not consider the configuration of the register itself.

The present invention was made in consideration of the above-mentioned problems, and an object thereof is to provide a semiconductor device, a peripheral device control system, and a peripheral device control method that mitigate an increase in processing load on the microcomputer as well as mitigating an increase in burden to related devices, even with a greater number of devices to be managed by the microcomputer.

SUMMARY OF THE INVENTION

A semiconductor device according to the present invention includes: one or more management blocks that are provided in association with a device to be controlled, and that include a plurality of registers that are configured to store information pertaining to each operation of the device to be controlled; and a first generation unit that is configured to perform a predetermined process on values of the plurality of registers included in the management block, and to generate an aggregation value that is a value in which the values of the plurality of registers are aggregated, the aggregation value being refreshed and updated by an external control device.

A peripheral device control system according to the present invention includes: the above-mentioned semiconductor device; one or more devices to be controlled that are provided for each of the semiconductor devices, and that are configured to receive control operations from the semiconductor devices; and a control device that is configured to access the first generation unit of the semiconductor device and to perform refreshing and updating of the aggregation value.

In a peripheral device control method according to the present invention, one or more management blocks are provided in association with a device to be controlled, and include a plurality of registers that are configured to store information pertaining to each operation of the device to be controlled, and a predetermined process is performed on values of the plurality of registers included in the management block, and an aggregation value that is a value in which the values of the plurality of registers are aggregated is generated, the aggregation value being refreshed and updated by an external control device.

The present invention can provide a semiconductor device, a peripheral device control system, and a peripheral device control method that mitigate an increase in processing load on the microcomputer as well as mitigating an increase in burden to related devices, even with a greater number of devices to be managed by the microcomputer.

BRIEF DESCRIPTION OF THE DRAWINGS

FIG. 4 is a block diagram showing an example of a peripheral device control IC and a peripheral device control system according to a comparison example.

DETAILED DESCRIPTION OF EMBODIMENTS

Below, embodiments of the present invention will be described in detail with reference to the drawings. In the embodiments below, a peripheral device control IC is described as an example of a semiconductor device according to the present invention.

Embodiment 1

A semiconductor device, a peripheral device control system, and a peripheral device control method according to the present embodiment will be described with reference to FIGS. 1 and 2A to 2C.

Figure 1:
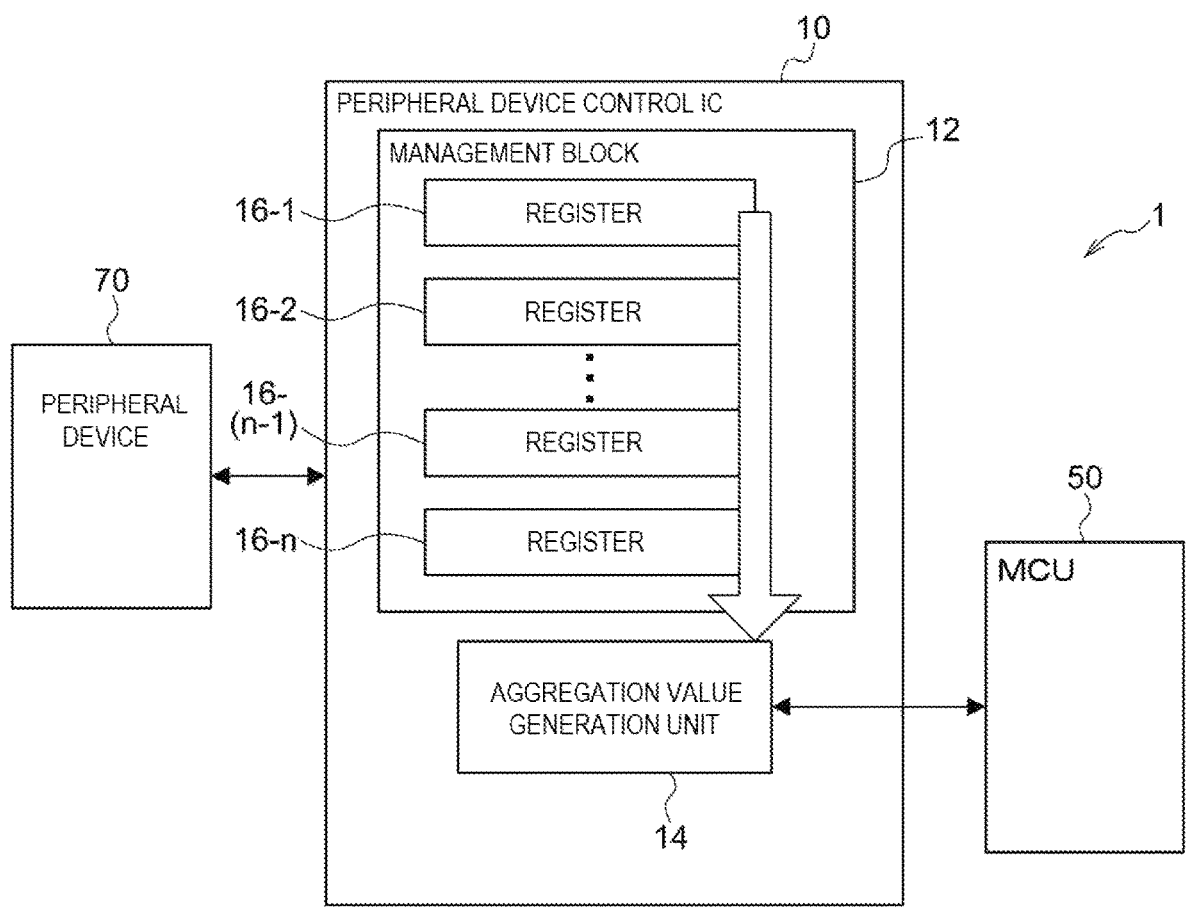
FIG. 1 is a block diagram showing an example of a peripheral device control IC and a peripheral device control system according to Embodiment 1.

FIG. 1 shows a peripheral device control system 1 according to the present embodiment. As shown in FIG. 1, the peripheral device control system 1 includes a peripheral device control IC 10 as the semiconductor device of the present invention, an MCU 50, and a peripheral device 70. The peripheral device 70 and the MCU 50 are examples, respectively, of the "device to be controlled" and the "control device" of the present invention.

The MCU 50 controls the entire system including controlling the peripheral device control IC 10 and the peripheral device 70. The MCU 50 is installed in a vehicle-installed device such as a navigation system, for example, and performs integrated control of the entire relevant peripheral device. Functions corresponding to those of the MCU 50 are sometimes realized as a portion of an SoC (system on a chip).

The peripheral device 70 is a unit having a specific function to be controlled in the peripheral device control system 1 such as various sensors, a display controller, or an image correction chip as described above, for example.

The peripheral device control IC 10 includes a management block 12 corresponding to the peripheral device 70. As shown in FIG. 1, the management block 12 includes a plurality (n in the case of the present embodiment) registers 16-1, 16-2 . . . 16-(n−1), and 16-n (referred to collectively as "registers 16" below) and an aggregation value generation unit 14. The registers 16 are storage means (memory) that store information pertaining to operations such as the current state, settings, and the presence or lack of an anomaly in the peripheral device 70 (hereinafter, "operation information"). There is no particular limitation on the size of the registers 16, but the size is set to 16 bits in the present embodiment, for example.

As shown in FIG. 1, in the present embodiment, the registers 16 in the peripheral device control IC 10 are collectively managed by the management block 12. In other words, a predetermined operation is performed on individual values of the registers 16 (numerical value indicating operation information), and the values are compressed as "aggregation values". As a result, the values of the registers 16 are aggregated to generate an aggregation value that is smaller in data size than a sum or other arithmetic combination of the values would be. According to one embodiment, when the MCU 50 accesses the registers 16, it accesses the aggregation value generation unit 14 to cause the aggregation value generation unit 14 to perform the aggregation process on the values in the registers. Details regarding management performed by the management block 12 will be described later. The management block 12 may be split for each function of the peripheral device 70, or may be split for each display if two displays are provided in the peripheral device control system 1, for example.

With reference to FIG. 4, a peripheral device control IC 100 according to a comparison example and a peripheral device control system according to the comparison example that includes the peripheral device control IC 100 will be described. The peripheral device control system according to the comparison example includes an MCU 50 and a peripheral device 70 in addition to the peripheral device control IC 100.

As shown in FIG. 4, in the peripheral device control system according to the comparison example, registers 16-1, 16-2 . . . 16-(n−1), and 16-n in the peripheral device control IC 100 are independent units (not collectively managed as in the present embodiment). Approximately 1,000 registers 16 are provided according to the number of pieces of operation information that are required or the like, for example, and addresses of the storage means constituting the registers are assigned to the respective pieces of operation information. The MCU 50 accesses the registers 16 by designating the addresses. In other words, the MCU 50 designates the address, performs refreshing, updating, and the like of the operation information of the registers 16, and reads the operation information stored in the registers 16. In the peripheral device control system according to the comparison example, the MCU 50 performs the refreshing process a number of times equal to the number of registers 16, for example. Thus, the MCU 50 needs to perform frequent refreshing, which increases the software load on the MCU 50 or results in deterioration of the registers 16, for example.

The term "refresh" has various meanings, but in the present embodiment is defined as a process of writing information and reading the written information, or a process in which checking is added to the aforementioned process. "Checking" in the present embodiment is defined as comparing the value of the register 16 currently being read to a value of a register 16 read prior thereto (immediately prior, for example), and detecting a difference therebetween or a lack thereof.

By contrast to the peripheral device control system of the comparison example, in the peripheral device control IC 10 of the peripheral device control system 1, a given number of registers 16 are collectively managed as the management block 12 in the peripheral device control IC 10, and the values of the registers 16 are greatly reduced in value to 16-bit data, for example. As a result, it is possible to reduce the number of reads from the MCU 50 during an operation such as refreshing or updating, thereby reducing the burden of software processing on the MCU 50. Also, as a result, it is possible to reduce the probability that the MCU 50 freezes as a result of a software bottleneck, and additionally, the speed at which anomalies in the peripheral device control IC 10 or the peripheral device 70 are read increases, resulting in an efficient system.

Next, details regarding the process performed in the management block 12 will be described. The aggregation value generation unit 14 provided in the management block 12 performs predetermined processing on the values stored in the registers 16-1 to 16-*n*, and generates simplified values (aggregation values) that reflect the values of the registers 16. If each of the registers 16 is 16 bits, for example, then values of n×16 bits are aggregated (simplified) to only 16 bits, and the amount of data to be accessed by the MCU 50 is reduced to 1/n. In other words, in embodiments of the invention, a plurality of registers having a predetermined bit length are simplified or compressed into a single aggregated value of the predetermined bit length, instead of a value that would arithmetically result from the combination of the number of registers times the bit length of the registers.

There is no particular limitation on the operation method of the aggregation value generation unit 14 as long as one value is generated using the values of the registers 16, but in the present embodiment, a cyclic redundancy check (CRC) checksum is used. CRC is a type of error detection code, and is primarily used for detecting incidental errors resulting from data transmission or the like. The transmission side adds as test data the remainder of division performed using a set generation polynomial and transmits the test data, the reception side divides the data using the same generation polynomial, and by comparing the remainders to each other, error or damage to the received data is detected. With CRC, the bit length (4 bits, 16 bits, 32 bits, etc.) of the test data generated by the generation polynomial differs. In the present embodiment, this test data is handled as the aggregation value. As described above, the bit length of the aggregation value is set to 16 bits in the present embodiment, for example.

In the aggregation value generation unit 14, the generation of the aggregation value is performed at a predetermined timing, and the generated aggregation value is stored in a storage unit (not shown). There is no particular limitation on the timing at which the aggregation value generation unit 14 generates the aggregation value, but the aggregation value may be periodically generated at a predetermined frequency independent of any command from the MCU 50, for example. Alternatively, the timing may be updated as a setting as a result of access from the MCU 50.

The generation of the aggregation value in the aggregation value generation unit 14 may be performed collectively for all of the registers 16-1 to 16-*n*, or the storage region for the registers 16-1 to 16-*n* may be split into a plurality of regions (hereinafter, "split regions") with the generation of the aggregation value being performed for each split region. In this case, the designation of the split region is performed by designating the range of the address. By splitting the storage region for the registers 16 into a plurality of split regions, the processing may differ for each split region. It is possible to attain a configuration in which the plurality of split regions are assigned grades according to the degree of importance or the like of the content of the registers 16, for example, with refreshing being performed more frequently in split regions with a higher degree of importance and refreshing being performed less frequently in split regions with a lower degree of importance, or the like. According to this configuration, more efficient refreshing can be performed compared to a case in which the registers 16 are all refreshed. The split regions need not necessarily be fixed, and may be changed according to operation conditions or the like of the peripheral device 70. For example, a first split region in memory may include one register 16, while a second split region in memory may have two or more registers and may be configured by the peripheral device control IC 10 to have its register values refreshed more or less frequently than in the first split region.

Next, a monitoring method for the peripheral device control system 1 will be described. First, the self-monitoring function of the peripheral device control IC 10 operates as follows. The aggregation value generation unit 14 can perform self-monitoring by comparing the currently generated aggregation value and previously-generated aggregation value (the immediately-prior aggregation value, for example). In one embodiment, the previously-generated aggregation value is stored in a retention unit, which may be a location in memory of the peripheral device control IC 10 allocated for storing aggregation values. If the aggregation value is detected to have changed without access from the MCU 50, it is considered that an error has occurred in the management block 12, and a notification to that effect is issued to the MCU 50, for example. According to this configuration, it is possible to reduce the monitoring burden on the peripheral device control IC 10 by the MCU 50.

Meanwhile, the MCU 50 includes a detection unit and can detect anomalies in the peripheral device control IC 10 as follows. By the MCU 50 reading the aggregation value from the peripheral device control IC 10, it can determine, by the determination unit, whether or not there is an anomaly in the value of the registers 16 in the peripheral device control IC 10. In outputting an error, a logical disjunction of the value of each block and all errors is stored in the internal register, and errors can be confirmed through one reading operation. This detection of an anomaly may be performed periodically or in conjunction with a specific event such as when updating the values of the registers 16. The detection unit may include one or more processors and control circuitry, and may include software stored in memory that controls a processor of the MCU 50 to perform the above-described detection function. Likewise, the determination unit may include one or more processors and control circuitry, and may include software stored in memory that controls a processor of the MCU 50 to perform the above-described determination function.

Additionally, the MCU 50 can detect anomalies when updating the peripheral device control IC 10. In such a case, the MCU 50 has an aggregation value generation unit having the same function as the aggregation value generation unit 14 of the peripheral device control IC 10. When the MCU 50 resets the peripheral device control IC 10, the values in the registers 16 of the peripheral device control IC 10 are updated, and a generation process is performed in the generation means of the MCU 50 itself for the updated values. After the peripheral device control IC 10 is updated, the aggregation value read from the aggregation value generation unit 14 is compared with the aggregation value generated by the MCU 50, and if these values differ, it can be determined that there is an anomaly in the peripheral device control system 1. The timing at which the MCU 50 performs monitoring may be set to a predetermined interval, for example, instead of whenever the peripheral device control IC 10 is updated.

Figure 2A:
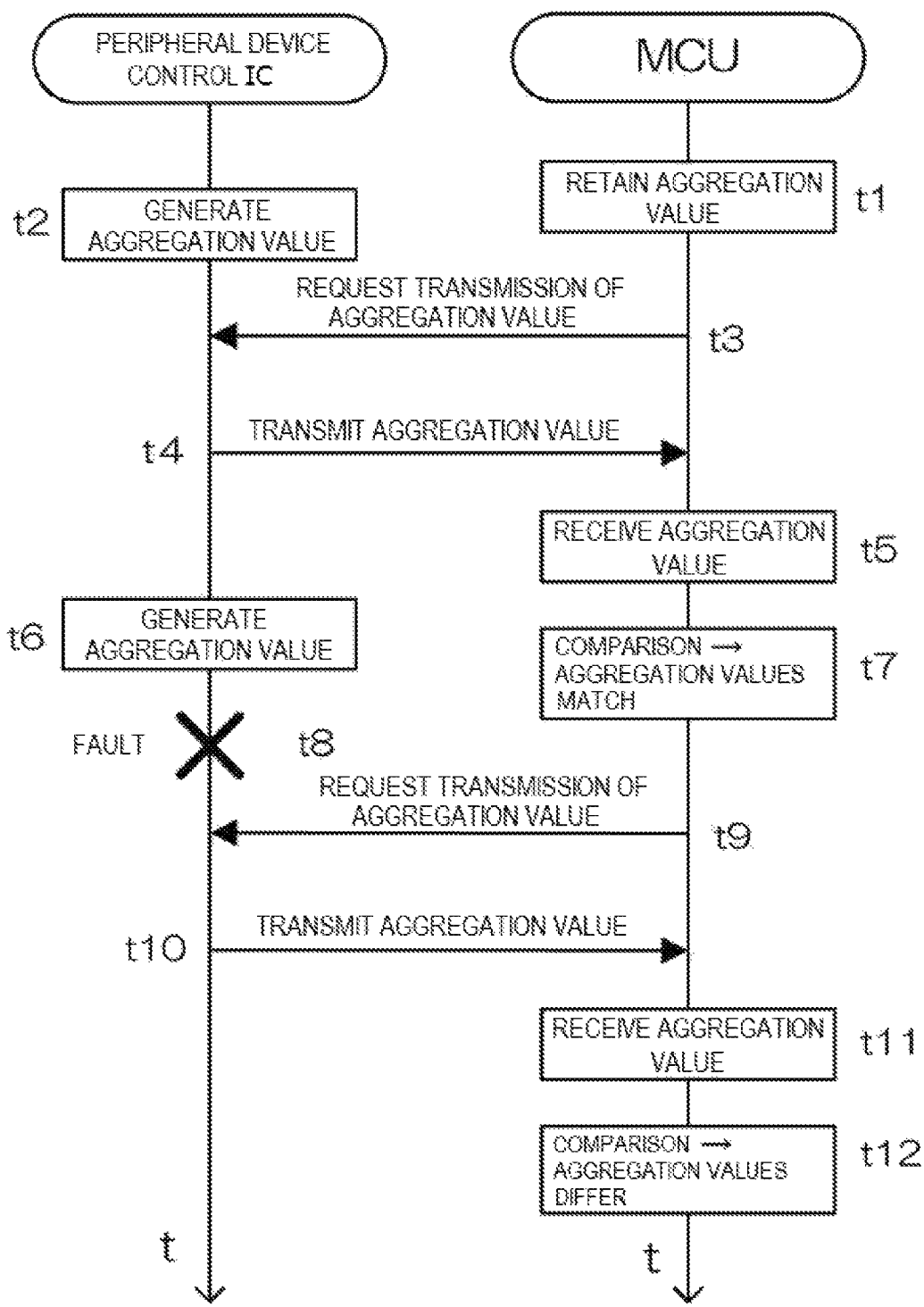
FIGS. 2A to 2C are timing charts showing the flow of a peripheral device control process according to Embodiment 1.
Figure 2B:
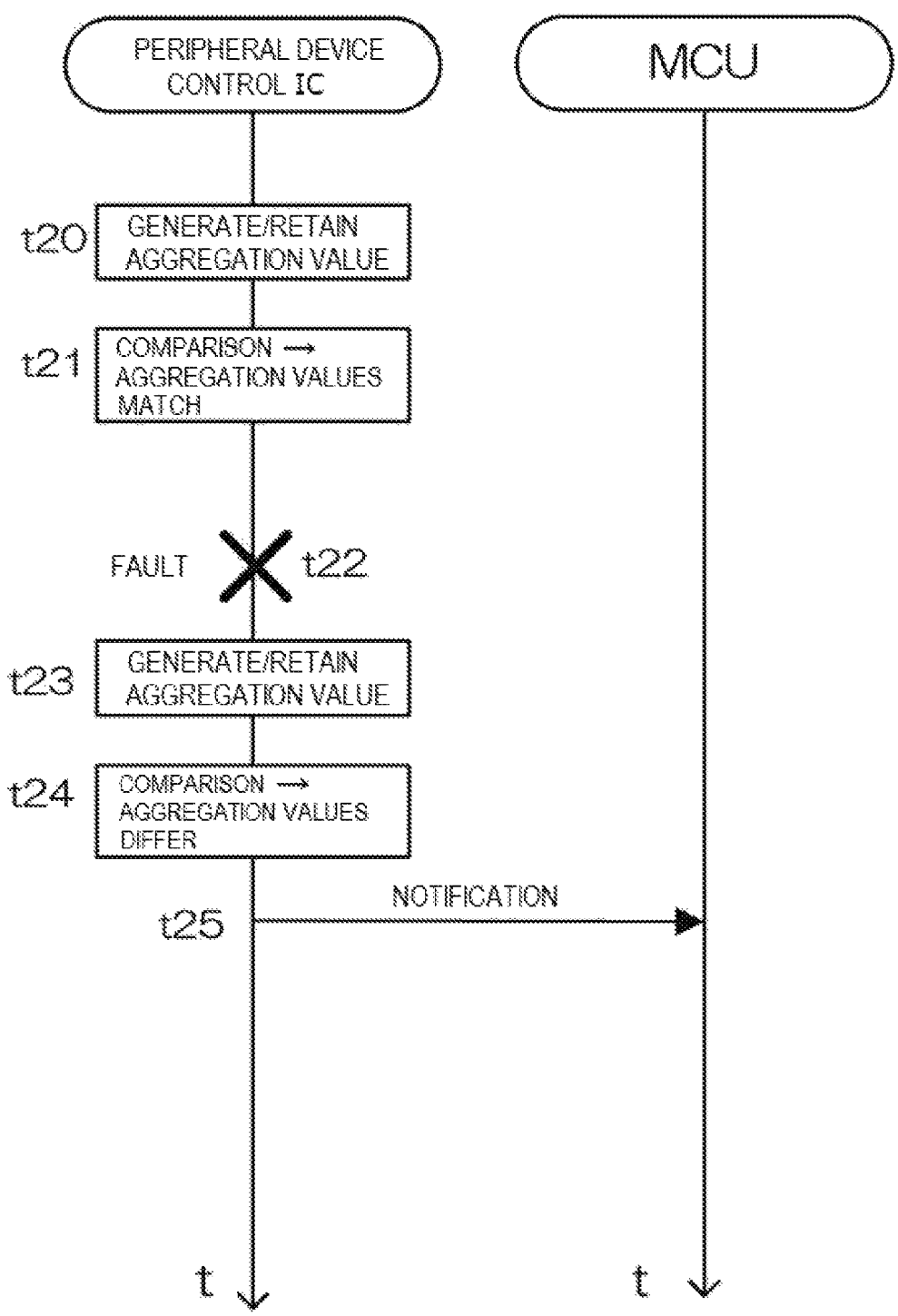
Figure 2C:
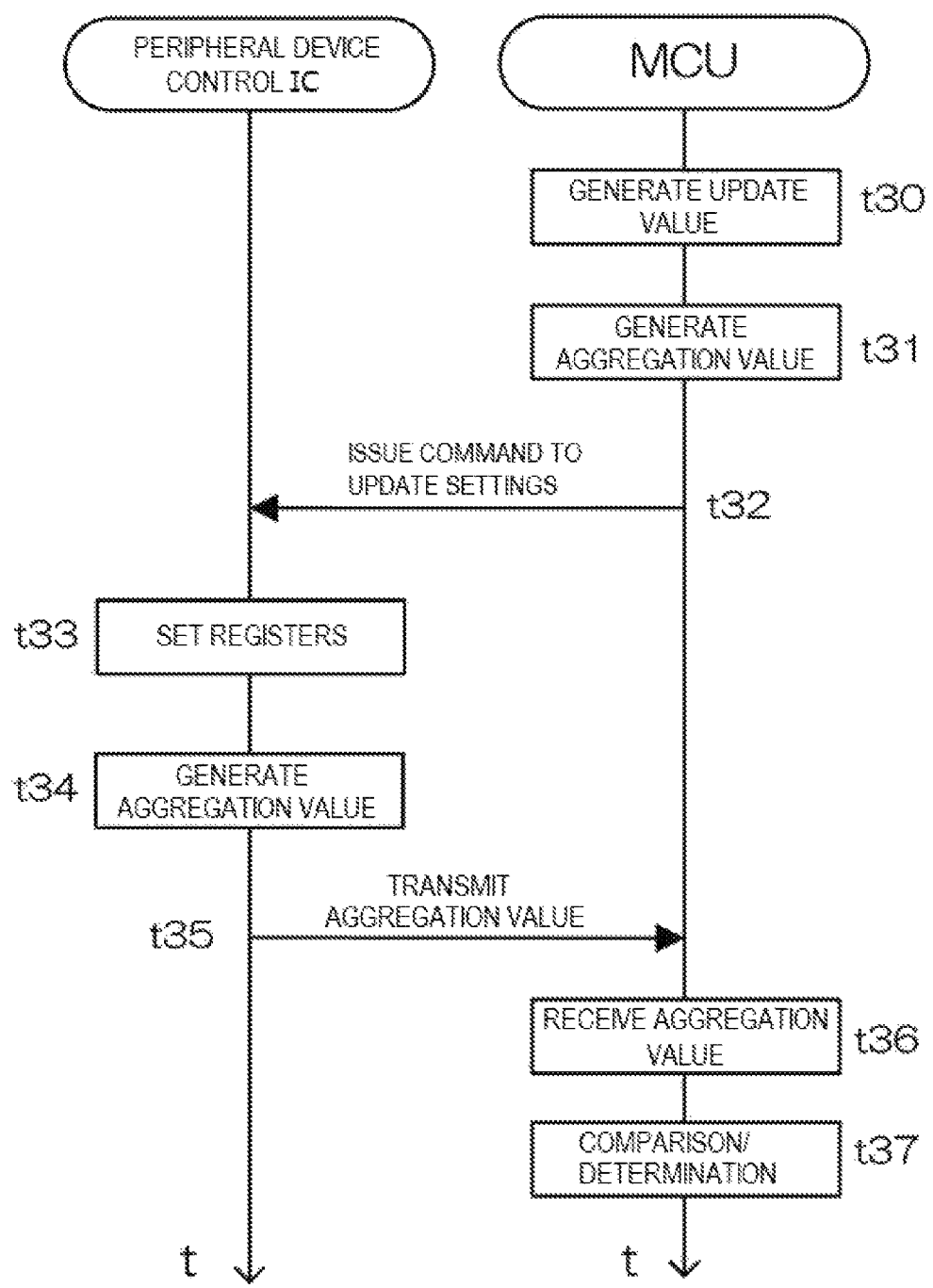

Next, a peripheral device control process executed in a peripheral device control system 1 according to the present embodiment will be described with reference to FIGS. 2A to 2C. FIGS. 2A to 2C show the peripheral device control process in terms of the process performed in the peripheral device control IC 10 and the MCU 50 as well as the transmission and reception of signals therebetween in chronological order.

FIG. 2A shows the process of detecting an anomaly in the peripheral device control IC 10 by the MCU 50. As shown in FIG. 2A, at a time t1, the MCU 50 retains an aggregation value previously acquired from the peripheral device control IC 10. At a time t2, the peripheral device control IC 10 generates an aggregation value. The generation of the aggregation value here is a portion of the process of periodically generating an aggregation value, for example. At a time t3, the MCU 50 issues a request to the peripheral device control IC 10 to transmit the aggregation value. Upon receipt of the transmission request, the peripheral device control IC 10 transmits the aggregation value at a time t4, and the MCU 50 receives the aggregation value at a time t5. At a time t7, the MCU 50 compares the received aggregation value with the aggregation value retained at the time t1, and as a result, finds that the aggregation values match, or are the same, thereby determining that there is no anomaly in the peripheral device control IC 10.

Meanwhile, at the time t6, the peripheral device control IC 10 has generated the aggregation value, but a fault occurs in the registers 16 at a time t8, resulting in the values of the registers 16 changing. At a time t9, the MCU 50 issues a request to the peripheral device control IC 10 to transmit the aggregation value, and the peripheral device control IC 10 transmits the aggregation value at a time t10. The MCU 50 receives the aggregation value at a time t11, and at a time t12 compares the received aggregation value to the aggregation value received at the time t5. The comparison reveals that the aggregation values differ from each other, and thus, the MCU 50 determines that an error has occurred in the peripheral device control IC 10. Upon determining that an error has occurred, the MCU 50 may perform one or more control processes, such as providing an output signal indicating an error, clearing or resetting the registers 16-1 to 16-n, controlling the peripheral device control IC 10 to identify the one or more registers 16-1 to 16-n having the error there, resetting the peripheral device control IC 10, or any other process to compensate for or correct the detected errors.

FIG. 2B shows an aspect in which, if a fault occurs in the peripheral device control IC 10, the peripheral device control IC 10 actively issues a notification to that effect to the MCU 50. At a time t20, the peripheral device control IC 10 generates an aggregation value and stores and retains the generated value in a storage unit (not shown). At a time t21 the peripheral device control IC 10 compares the generated aggregation value with the aggregation value that was previously generated and stored, and as a result, finds that the aggregation values match, thereby determining that there is no anomaly.

However, at a time t22, a fault occurs in the peripheral device control IC 10, resulting in the values of the registers 16 changing. At a time t23, the peripheral device control IC 10 generates and stores an aggregation value as a part of a periodic operation. At a time t24, the peripheral device control IC 10 compares the generated aggregation value with the aggregation value stored at the time t20, and as a result, finds that the aggregation values differ, thereby detecting that an anomaly has occurred in the peripheral device control IC 10 itself. The peripheral device control IC 10 issues a notification of the anomaly to the MCU 50 at a time t25. The process of FIG. 2B corresponds to the process in the self-monitoring function of the peripheral device control IC 10 such as previously described.

FIG. 2C shows a process performed when the MCU 50 issues a command to the peripheral device control IC 10 to update the registers 16. At a time t30, the MCU 50 generates values for the registers 16 to be updated, and at a time t31, the MCU 50 generates an aggregation value using the values of the registers to be updated. Then, at a time t32, the MCU 50 issues a command to the peripheral device control IC 10 to update the registers 16. Upon receipt of the updating command, the peripheral device control IC 10 updates the values of the registers 16 at a time t33 and generates an aggregation value at a time t34. Then, the peripheral device control IC 10 transmits the aggregation value to the MCU 50 at a time t35, and the MCU 50 receives the aggregation value at a time t36. Then, the MCU 50 compares the received aggregation value to the aggregation value generated at the time t31, and determines whether or not updating of the registers 16 was successful.

As described above, with the semiconductor device, the peripheral device control system, and the peripheral device control method according to the present embodiment, it is possible to monitor the internal state of the peripheral device control IC 10 by writing to the aggregation value generation unit 14 (storage unit, for example) instead of writing to all of the registers 16 in the peripheral device control IC 10. The time taken for the MCU 50 to access the peripheral device control IC 10 and the time taken to read the registers 16, for example, can be shortened to $3/256$ of the time taken in a conventional configuration if the aggregation values are managed in 3 byte chunks and the management block is managed in 256 byte chunks of the registers 16. However, this is merely an estimate, and in reality, the time taken for operations other than reading data changes according to the access method, and thus, the time reduction also differs. In other words, with the semiconductor device, the peripheral device control system, and the peripheral device control method of the present embodiment, the processing time for the MCU 50 to access the peripheral device control IC 10 is greatly reduced. Thus, as a result of extra available time, it is possible to increase the number of times the peripheral device control IC 10 is accessed, and to increase the number of times error confirmation is performed, thereby allowing for early discovery of errors and updating. If only managing errors, it is possible to detect problems essentially by reading error bits, and thus, it is possible to satisfy the refreshing function every time the peripheral device control IC 10 is accessed.

Embodiment 2

A semiconductor device, a peripheral device control system, and a peripheral device control method according to the present embodiment will be described with reference to FIG. 3. The peripheral device control system 1A according to the present embodiment includes a peripheral device control IC 10A, an MCU 50, and peripheral devices 70-1, 70-2 . . . 70-m. The present embodiment differs from the previous embodiment in that the peripheral device control IC 10A includes a plurality of management blocks. Other aspects are similar to those of the previous embodiment, and therefore, the same components are assigned the same reference characters and detailed descriptions thereof are omitted.

Figure 3:
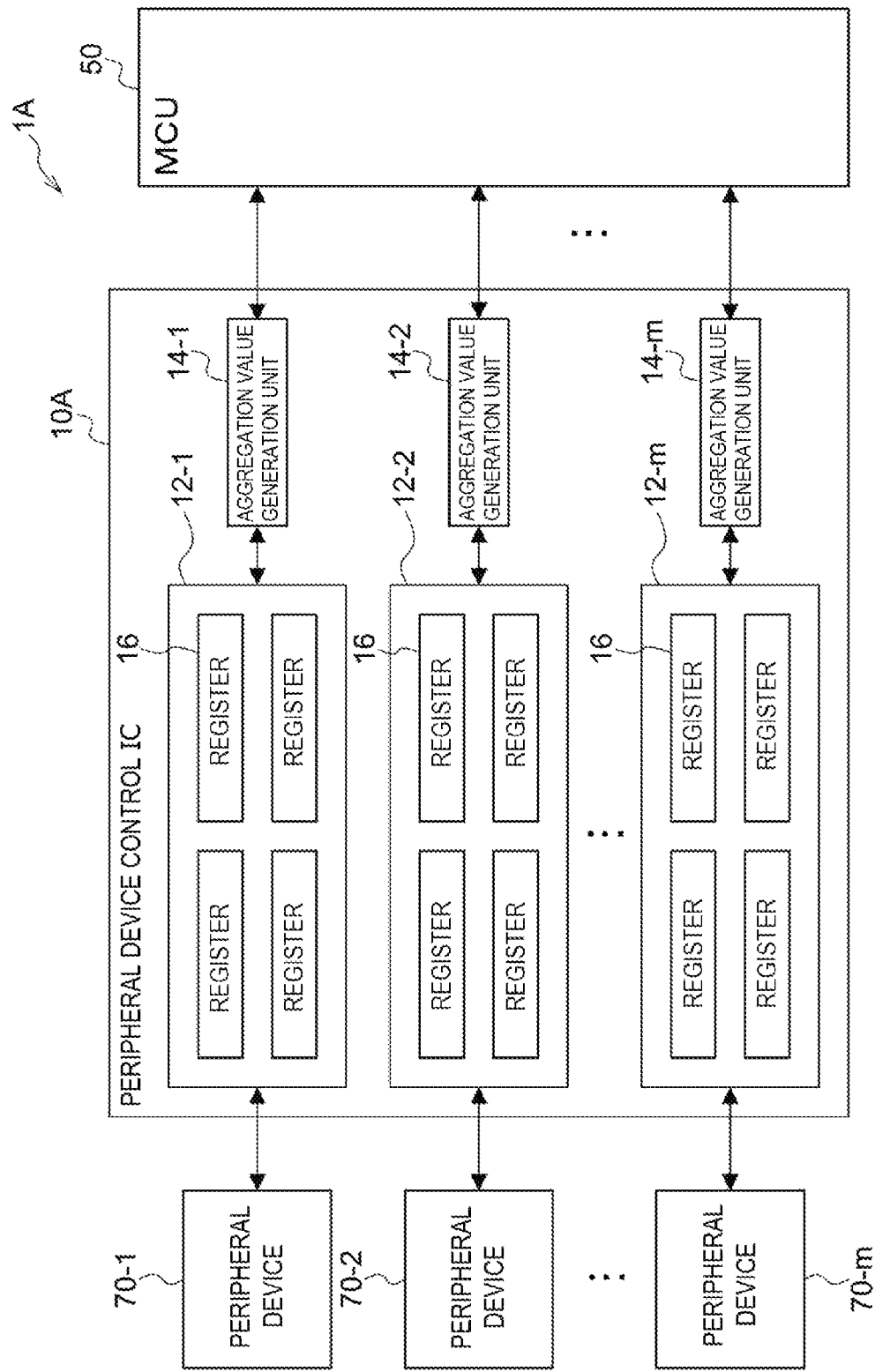
FIG. 3 is a block diagram showing a peripheral device control IC and a peripheral device control system according to Embodiment 2.

As shown in FIG. 3, the peripheral device control IC 10A includes a plurality of management blocks 12-1, 12-2 . . . 12-m (FIG. 3 shows an example in which there are m management blocks) and aggregation value generation units 14-1, 14-2 . . . 14m. Each of the aggregation value generation units 14-1, 14-2 . . . 14-m is individually connected to the MCU 50, and each of the management blocks 12-1, 12-2 ... 12-*m* is connected to each of the peripheral devices 70-1, 70-2 ... 70-*m*.

Each of the management blocks 12-1, 12-2 ... 12-*m* includes a plurality of registers 16 (FIG. 3 shows an example in which there are four registers each). A management block 12-*i* (i being a value of 1 to m) retains values pertaining to operations in the registers 16 in order to control the corresponding peripheral device 70-*i* (i being a value of 1 to m). The respective peripheral devices 70-*i* (i being a value of 1-m) may be differing items to be controlled such as a sensor, a display controller, or an image correction chip, or may be a plurality of the same type of item to be controlled such as two different displays.

Meanwhile, the MCU 50 individually accesses the aggregation value generation units 14-1, 14-2 ... 14-*m*, and individually performs processes such as refreshing and updating. Specific processes by the peripheral device control IC 10A and the MCU 50 are similar to the previous embodiment, and thus, detailed descriptions thereof are omitted.

With the semiconductor device, the peripheral device control system, and the peripheral device control method according to the present embodiment, the process for the plurality of peripheral devices can be performed by accessing a single peripheral device control IC 10A, and more efficient processing can be performed according to this configuration as compared to a configuration in which a peripheral device control IC 10 is provided for each peripheral device 70. Also, the address of each memory can be split to form split regions, with each split region being allocated to each peripheral device 70-1, 70-2 ... 70-*m*, which is also efficient from a memory capacity perspective. Furthermore, there is only one peripheral device control IC 10A, and thus, the probability of an error occurring is also reduced.

In the present embodiment, aggregation values are generated by the aggregation value generation units 14-1, 14-2 ... 14-*m*, which are disposed individually for the peripheral devices 70-1, 70-2 ... 70-*m*, but the configuration is not limited thereto, and the values of the aggregation value generation units 14-1, 14-2 ... 14-*m* may be further consolidated to one aggregation value, for example. The method for generating the first aggregation value need not necessarily be the same as the method for generating the second aggregation value, and different generation methods may be used.

In addition, while the present embodiment includes separate management blocks 12 for each separate peripheral device 70, embodiments of the invention further include separate management blocks for separate peripheral devices and multiple split regions within one or more of the management blocks to allow for different processing of aggregation values for registers associated with a same peripheral device.

DESCRIPTION OF REFERENCE CHARACTERS

1, 1A peripheral device control system
10, 10A peripheral device control IC
12, 12-1, 12-2, 12-*m* management block
14, 14-1, 14-2, 14-*m* aggregation value generation unit
16, 16-1, 16-2, 16-(*n*−1), 16-*n* register
50 MCU
70, 70-1, 70-2, 70-*m* peripheral device
100 peripheral device control IC

What is claimed is:

1. A semiconductor device, comprising:
   one or more management blocks that are each provided in association with a device to be controlled by the semiconductor device or by an external control device in communication with the semiconductor device, and that include a plurality of registers that are configured to store information pertaining to each operation of the device to be controlled; and
   a first aggregation value generation unit configured to perform a predetermined aggregation process on values of the plurality of registers included in the management block and to generate a first aggregation value that is a value formed by aggregating the values of the plurality of registers and that is smaller in data size than a sum or other arithmetic combination of the values of the plurality of registers, the first aggregation value being refreshed and updated based on a command from the external control device;
   wherein the plurality of registers are divided into a plurality of split regions, each of the plurality of split regions including at least one of the plurality of registers,
   wherein the first aggregation value generation unit includes a plurality of aggregation value generation units, each of the plurality of split regions having a separate aggregation value generation unit,
   wherein each of the plurality of split regions is assigned an order of priority for the refreshing and updating of the separate aggregation value generation units of respective split regions among the plurality of split regions,
   wherein a first split region of the plurality of split regions has a different number of registers than does a second split region of the split regions, and
   wherein the separate aggregation value generation unit of the first split region is refreshed and updated with a different frequency than is the separate aggregation value generation unit of the second split region.

2. The semiconductor device according to claim 1, wherein the first aggregation value generation unit is configured to periodically generate the first aggregation value independently of the command from the external control device.

3. The semiconductor device according to claim 2, further comprising:
   a retention unit that is configured to retain a prior aggregation value,
   wherein the generated first aggregation value is compared with the prior aggregation value retained in the retention unit, and the control device is notified if the first aggregation value and the prior aggregation value do not match each other.

4. The semiconductor device according to claim 1, wherein the one or more management blocks includes a plurality of management blocks, each of the management blocks being in association with a separate device to be controlled, and
   wherein a separate first aggregation value is generated for each of the plurality of management blocks.

5. The semiconductor device according to claim 4, further comprising:
   a second aggregation value generation unit that is configured to additionally perform another predetermined aggregation process on a plurality of the first aggregation values generated for each of the plurality of management blocks to generate a second aggregation value.

6. The semiconductor device according to claim 1, wherein the predetermined aggregation process is a cyclic redundancy check.

7. A peripheral device control system, comprising:
the semiconductor device according to claim 1;
one or more of the devices to be controlled that are configured to receive control operations from the semiconductor device; and
the control device, the control device being configured to access the first aggregation value generation unit of the semiconductor device and perform refreshing and updating of the first aggregation value.

8. The peripheral device control system according to claim 7,
wherein the control device comprises:
a storage unit configured to store a prior aggregation value and to periodically acquire the first aggregation value from the first generation unit; and
a detection unit configured to detect that an anomaly has occurred in the semiconductor device if the acquired first aggregation value differs from the prior aggregation value stored in the storage unit.

9. The peripheral device control system according to claim 8,
wherein the control device further includes:
a third aggregation value generation unit configured such that, when the control device controls the semiconductor device to update the plurality of registers, the third aggregation value generation unit generates a third aggregation value using the values of the plurality of registers; and
a determination unit that, upon receiving updates from the first aggregation value generation unit for the plurality of registers, compares the first aggregation value generated by the first aggregation value generation unit with the third aggregation value generated by the third aggregation value generation unit to determine whether or not there is an anomaly in the semiconductor device.

10. A peripheral device control method, comprising:
storing information pertaining to an operation of a device to be controlled in a plurality of registers of a semiconductor device, the plurality of registers organized into one or more management blocks;
performing a predetermined aggregation process on values stored in the plurality of registers to generate an aggregation value that is a value formed by aggregating the values of the plurality of registers and that is smaller in data size than a sum or other arithmetic combination of the values of the plurality of registers;
controlling, by an external control device, the one or more management blocks to update and refresh the aggregation value;
dividing the plurality of registers into a plurality of split regions, each of the plurality of split regions including at least one of the plurality of registers;
providing each of the plurality of split regions with a separate aggregation value generation unit;
assigning each of the plurality of split regions an order of priority for refreshing and updating of the separate aggregation value generation units of respective split regions among the plurality of split regions;
assigning a different number of registers to a first split region of the plurality of split regions than a number of registers assigned to a second split region of the split regions; and
refreshing and updating the separate aggregation value generation unit of the first split region with a different frequency from a frequency of refreshing and updating the separate aggregation value generation unit of the second split region.

* * * * *